Oct. 12, 1965     M. B. EMIG     3,211,269
ESCAPEMENT ASSEMBLY WITH FORCE RELIEVED
BEFORE REMOVEMENT OF PAWL FROM RACK
Filed Feb. 19, 1964     2 Sheets-Sheet 1

INVENTOR.
MARSDEN B. EMIG

BY *John A. Brady*

ATTORNEY.

United States Patent Office 3,211,269
Patented Oct. 12, 1965

3,211,269
ESCAPEMENT ASSEMBLY WITH FORCE RE-
LIEVED BEFORE REMOVEMENT OF PAWL
FROM RACK
Marsden B. Emig, Lexington, Ky., assignor to International Business Machines Corporation, New York, N.Y., a corporation of New York
Filed Feb. 19, 1964, Ser. No. 345,966
13 Claims. (Cl. 197—86)

This invention relates to escapements. In particular, this invention relates to an escapement pawl assembly by which a pawl moves from a tooth or projection with low friction between the pawl and the tooth. Although the invention was developed for use with a typewriter, it can be incorporated into any escapement environment.

Escapement pawls of the prior art are generally directly pulled out of engagement with a spring biased rack. In other words, a toothed rack of some kind is normally urged in one direction and is held against movement by the end of a pawl. To step the toothed rack the pawl is simply pivoted out of engagement and then allowed to return to its original place after the rack has moved somewhat under its normal tendency to move. Such escapements are well known in the prior art. A sophisticated example of a modification of such escapements used in the typewriter technology is found in United States Patent 2,741,355; which is assigned to the same assignee to which this patent application is assigned.

Upon reflection, it is clear that the prior art escapements just described are high sliding friction systems. The pawl and the rack tooth are forced against one another with all of the force of the means biasing the rack. The entire lateral movement of the pawl out from the tooth will be resisted by a friction proportional to this force.

One of the undesirable factors of repeated sliding against friction by an escapement pawl is wear at the engagement surface of the pawl. The pawl assembly is designed to move in and out with proper timing. Wear of the pawl tooth changes the geometry of the system and ultimately renders the system inoperative. Furthermore, to reduce wear, the pawl tooth generally must be made of larger material than would be necessary if the friction were not great.

A second undesirable factor arising from pawl friction is the relatively great force required to pull the pawl from the rack. This abstracts energy from the means causing escapement. Such lost energy is wasted. In a manual typewriter environment in which a type bar first pivots the pawl and then prints a character, a greater amount of energy is required from the exertions of the operator to overcome pawl friction and to print satisfactorily. Also, it has been found necessary in many applications in the prior art to form the pawl tooth in a circle where it intercepts the rack tooth so that it moves out easily. If friction is reduced, good results are obtained with the pawl tooth simply and economically fashioned to be straight with the rack tooth.

A third undesirable factor arising from the pawl friction is the variation in force required to move the pawl out from the rack. This is true particularly in the common occurrence of one rack tooth being deformed relative to the other teeth. I have discovered by experiment that the force used in a high sliding friction escapement system can vary considerably while the force used is more uniform in a low sliding friction system. In a typewriter environment, where a predetermined initial energy is given to the type bar, uniform force absorbed for escapement inherently produces a more uniform print.

Since a low friction system is one in which a mechanical complication is removed, other advantages of such a system doubtless exist which are not enumerated above.

It is an object of this invention to provide a pawl escapement system having low sliding friction at the pawl tooth as compared to prior escapements.

It is a further object of this invention to provide a pawl escapement system of low sliding friction which is economical and practical to build and use.

It is an object of the specific embodiment of this invention to provide a pawl escapement system of low sliding friction which is particularly well suited for use with a typewriter.

In accordance with the invention the pawl is normally held against lateral movement with the rack by a brace. During escapement, the brace is first removed. Removal of the brace relieves the strain between the pawl and the rack tooth. The pawl is then pulled out with low friction between the pawl and the rack.

The foregoing and other objects, features and advantages of the invention will be apparent from the following more particular description of a preferred embodiment of this invention, as illustrated in the accompanying drawings.

STRUCTURE AND GENERAL FUNCTION

Figure 1:
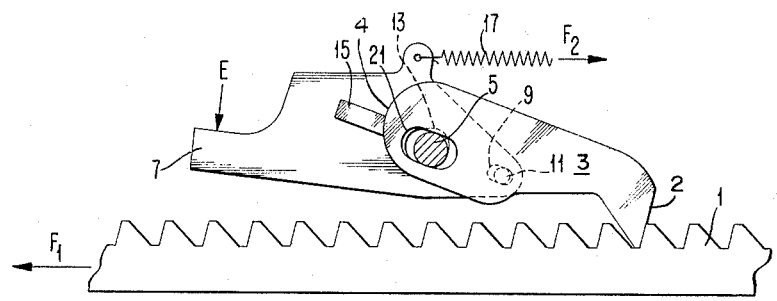
FIG. 1 shows the essentials of my escapement system in the hold position.

In FIG. 1 a rack 1 is seen being held by a pawl 3; the pawl having a front or first edge 2 and a back or second edge 4. In this preferred embodiment the rack 1 is part of the carriage of a conventional typewriter. As is also conventional, it is constantly biased in the carriage feed direction by a spring (not shown) which produces a force F1 in the carriage feed direction. The pawl assembly is connected to the frame (not shown) by the stud 5. Thus, when the parts are in the configuration shown in FIG. 1, the carriage rack 1 is held by the pawl 3 against movement tended to be imposed by the force F1. Reference is made to the above mentioned United States Patent 2,741,355 which will supply further environment to one not competely familiar with typewriter escapements.

Figure 2:
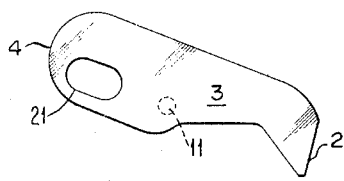
FIG. 2 is a detail of just the pawl of my escapement pawl assembly.
Figure 3:
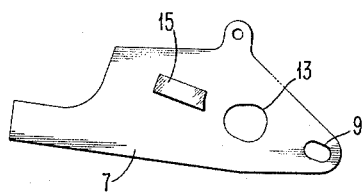
FIG. 3 is a detail of just the pawl control element of my escapement pawl assembly.

The pawl assembly of FIG. 1 is made up of two large sized elements, the pawl 3 and the pawl control element 7. The pawl control element 7 braces the pawl against lateral movement, and is also designed to remove the bracing and to lift the pawl 3 out of engagement with the rack 1. In accomplishing this the pawl control element 7 has an oblong slot 9 near its end which receives and meshes with a pivoting projection 11 projecting from the pawl 3. The pawl control element 7 has a larger eccentric opening 13, within which the stud 5 can be situated at different points. As above noted, the stud 5 is mounted to the frame (not shown). For clarity, the pawl 3 is shown individually in FIG. 2 and the pawl control element 7 is shown individually in FIG. 3.

The pawl control element 7 has an outwardly extending (in FIGS. 1 and 3) pawl brace 15 which braces the second, rear edge 4 of pawl 3 and has a surface conforming to the rear of pawl 3 when bracing is complete as shown in FIG. 1. Also as shown in FIG. 1, the pawl control element 7 is urged to its bracing position by spring 17, which exhibits a force F2 in the rightward direction. The pawl 3 also carries on oblong slot 21 (best seen in FIG. 2) which meshes with the stud 5. Stud 5 is, as above stated, mounted to the frame.

The escapement action of the oblong pawl slot 21, the eccentric opening 13 and the spring 17 is similar in the manner that the pawl 3 is moved to the teachings of the above cited United States Patent 2,741,355. Briefly, the pawl 3 is pivoted out of engagement with the rack 1 as in the prior art. The rack 1, due to its geometry, has a high enertia and does not move immediately. During this time, however, the spring 17 is effective to move the pawl 3 in the direction of the force F2 over the tooth of rack 1 previously engaged and into the space between that tooth and the next tooth. The oblong pawl slot 21 is necessary to allow the pawl 3 to move the required distance. In this invention, as distinguished from the prior art, the eccentric opening 13 is also necessary to obtain proper pawl movement between rack teeth. Subsequent movement of the rack 1 brings the next tooth into engagement with pawl 3, and the pawl assembly slides on the stud 5 until the rack 1 is once again firmly held by the pawl 3.

In my invention it is important in the specific embodiment that the oblong pawl slot 21 not finally engage the stud 5. The pawl 3 is held in engagement by the pawl brace 15 against extended movement with the rack 1. The pawl brace 15 can be pulled away in the manner to be fully described below. The oblong pawl slot 21 is still desirable so that the pawl can be moved during escapement by the spring 17 in the manner of cited Patent 2,741,355. However, in the preferred embodiment of this invention, the pawl 3 is moved laterally in response to a pushing action by pawl brace 15.

It will be noted in the inventive embodiment shown that the first edge 2, the front rack engaging edge of the pawl 3, is adapted to present a flat plane to the flat plane of the rack teeth. This is a structure which is economical to fabricate and implement. It has been determined that accurate positioning of the rack 1 is not only good, but is substantially improved with use of the flat engagement edge.

*HOLD POSITION OF PREFERRED EMBODIMENT*

FIG. 1 shows the hold position, that is, when the rack 1 is held by the pawl 3 against movement tended to be caused by the force F1 acting on rack 1. A detailed description of where the forces are exerted should clarify the hold position and the geometry of the parts necessary to obtain it.

Of importance is that the pawl 3 is held against lateral movement only by the pawl brace 15. The stud 5 is not engaged with either end of the oblong pawl slot 21, the slot 21 being long enough to permit this. The slot 21 can be said to be relatively long to indicate that it is long enough to perform the functions herein described without interfering with the action of pawl brace 15. Likewise, the pivoting projection 11, projecting from the pawl 3, is not engaged with either end of the pawl control element oblong slot 9. Oblong slot 9 can also be said to be relatively long to indicate that it is long enough not to interfere with the action of pawl brace 15. In the hold position, slots 9 and 21 are parallel so that the pawl 3 can move laterally into engagement with the pawl brace 15 in response to escapement movement by the rack 1.

Ultimately, the pawl 3 is held by the frame through stud 5. The connection, however, is through pawl brace 15 and pawl control element 7. This is true because the pawl control element 7, in the hold position, is bound to the stud 5 and thus to the frame by engagement of the pawl control element eccentric opening 13 and the stud 5. The point of engagement (see FIGS. 1 and 3) is near the lower right hand portions of eccentric opening 13.

The spring 17 has already performed its positioning function, which is discussed below. The spring 17 is essentially inoperative in the hold position.

ESCAPEMENT FUNCTIONS

A. *Strain relief position*

Escapement is effectuated by a pivoting force on the txtended portion at the left side of the pawl control element 7 at the point market E in FIG. 1. This is similar to prior art typewriter escapements, but the prior art, of course, does not have the pawl assembly of this invention.

Upon an escapement force at E, the pawl 3 initially tends to be held in engagement at the rack by friction between the front, first edge 2 of the panel 3 and the rack 1. In this invention, the pawl 3 does not move against this friction and thus experience wear and cause undesirable effects. Instead, a pivot point is found between the panel pivoting projection 11 and the side of pawl control element oblong slot 9.

Figure 4:
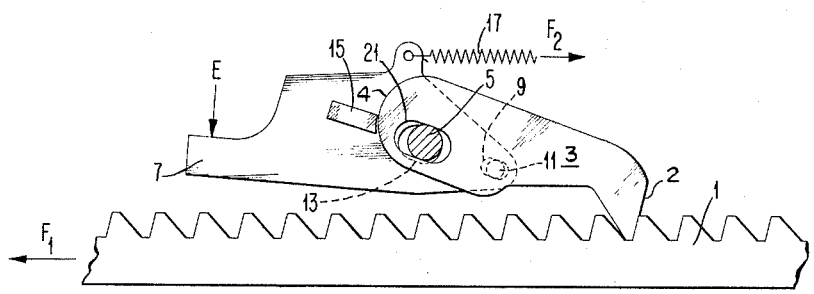
FIG. 4 shows the essentials of my escapement system in the strain relief position.

The pawl control element 7 pivots on pivoting projection 11 and the pawl brace 15 leaves the pawl 3 behind. Reference is made to FIG. 4, which shows the strain relief position. It will be noted upon close inspection that the back brace 15 has completely moved out of contact with the back edge of the pawl 3. It will also be noted that the pawl control element eccentric opening 13 has dimensions which present a free space to the stud 5 so that the entire pawl control element 7 can pivot freely on pawl pivoting projection 11 to the strain relief position.

The exact path of travel of the back brace 15 is a importance in the preferred embodiment since it is designed to be one opposed by little or no sliding friction. The back brace 15 moves in an arc centered at pivoting projection 11. The second edge 4, the back edge of the pawl, is curved and thus presents a slanting surface in the area where it is in the vicinity of back brace 15. The back brace 15 sits below the most extended point of the curve of the back of the pawl. As the back brace 15 moves in a relatively wide arc, it simply moves away from its contact with the second edge 4 of the pawl 3 without sliding which would be opposed by friction.

This invention has utility if it were implemented by a device having a sliding friction departure of the brace from the pawl. In particular, variations in force required for escapement due to differences in characteristics of the individual rack teeth would be reduced. However, stepping the brace away without friction is clearly preferable for most applications.

B. *Principle of strain relief*

It is not immediately obvious that the strain relief position as shown in FIG. 4 does, in fact, relieves the forces between the tooth of rack 1 and the pawl 3. It must be borne in mind that the large geometry of the rack 1 renders it relatively stationary for a time. High speed movies have confirmed this.

The rack position shown in FIG. 4 exists for a time even though the rack is apparently free to move by pushing the freed pawl 3 ahead of it. During the initial time after the pawl 3 is no longer braced, strain relief occurs between the rack 1 and the portions of the front edge 2 of the pawl 3 engaged with the rack 1. The pawl 3 is much smaller than the rack 1 and therefore moves to relieve itself in a shorter time.

The relief of frictional forces may be illustrated by reference to the following experiment. Three blocks can be placed side by side and held in the air. The two outside blocks might be suspended by the grip of the experimenter. The third block should be in the center. Some force must be applied between these, however, to hold the center block solely by friction. If one of the outside blocks is moved away, the center block drops downward. Removing one side of the opposing forces causes the force of the other side to be relieved and the friction grip at the other side to be virtually eliminated. This principle is utilized in this invention when the parts are in the strain relief position of FIG. 4. Within a short time relative to the time required for the rack 1 to move substantially, the friction force between the pawl 3 and the tooth of rack 1 drops to a small amount.

The pawl pivoting projection 11 is dimensioned with reference to the pawl control element oblong slot 9 to mesh so tightly as to bind the pawl 3 when the assembly is in the strain relief position.

C. *Pivoting of the pawl*

Figure 5:
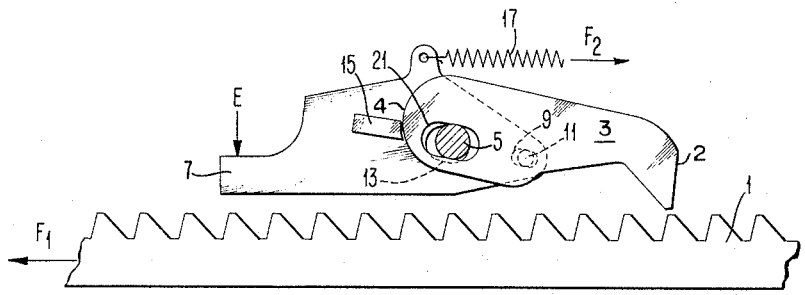
FIG. 5 shows the essentials of my escapement system in the pawl movement position.

With the strain relieved, the pawl 3 is then pivoted out of engagement with the rack 1. This is shown in FIG. 5. The escapement force E is effectively a continuous one until the pawl 3 is pivoted out. The pawl control element 7 has pivoted around the pivoting projection 11 until the top part of the eccentric opening 13 engages the stud 5. This, through the pawl pivoting projection 11 and the side of oblong slot 9, brings the pawl control element 7 firmly into a lever like engagement with the pawl 3. Thus, further pivoting of the pawl control element 7 pivots the pawl 3 upward.

When the pawl 3 is lifted out of engagement with the rack 1, further escapement occurs in a manner similar to the prior art discussed. The spring 17 moves the pawl control element 7. The pawl control element 7 is freed by eccentric opening 13 to move relative to the stud 5. The pawl brace 15 soon engages with the back of the pawl 3 at edge 4. Further movement of the pawl control element 7 moves the pawl 3 also. Oblong pawl slot 21 frees the pawl 3 to move relative to the stud 5.

In the preferred embodiment shown, the pawl control element eccentric opening 13 has a top surface which cams smoothly on stud 5 to bring pawl control element 7 upward toward the pawl holding position. The pawl 3 also cams on its oblong slot 21 to present the far back portions of edge 4 of pawl 3 to the back brace 15. As in the prior art, the force E is relaxed by this time. The spring 17 carries the pawl 3 horizontally and then down into the recess formed by the next tooth in the rack 1. In the invention, a clockwise torque arises from spring 17 when the back of eccentric opening 13 engages stud 5.

The rack 1 begins to move a substantial amount within a short time, and the next tooth on the rack 1 moves up to the front first edge 2 of panel 3 and engages it. The camming and pivoting action just described have already brought the system into alignment proper for the hold position. Movement of the rack 1 moves the pawl 3 with the rack 1 until all movement is stopped by the system binding in the hold position shown in FIG. 1. The oblong slot 9 in the pawl control element 7 allows the pawl control element 7 to move relative to the pivoting projection 11 and the pawl is thus held solely by the back brace 15. The rack 1, of course, has been advanced a distance of one tooth.

ENVIRONMENTAL STRUCTURES

Figure 6:
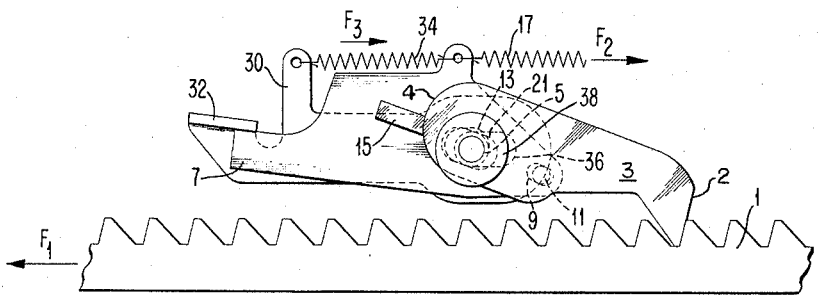
FIG. 6 shows the escapement pawl assembly with some further elements of importance in the preferred embodiment.

For purposes of clarity in the preceding description, only those elements basic to the preferred embodiment of the invention were shown. Two other items are worthy of note. These are shown in FIG. 6.

One of the elements is the trip plate 30. The trip plate 30 is the preferred means to provide the escapement force. It is a unitary plate freely journalled to the frame by the stud 5 beneath both the pawl 3 and the pawl control element 7. The trip plate 30 has an outwardly extending ledge 32, one side of which engages the end of the pawl control element 7 while the other side receives escapement force from an appropriate mechanism such as that shown in the previously referenced United States Patent 2,741,355. The trip plate is restored by its spring 34, which is connected to the pawl control element 7.

When the pawl control element 7 is moved by its spring 17, the end of pawl control element 7 moves from under the trip plate ledge 32. Simultaneously, the trip plate restoring spring 34, being connected to the pawl control element 7, is extended and then acts to restore the trip plate 30. When the pawl assembly is pushed back by the action of the rack, the end of the pawl control element 7 moves under the restored trip plate ledge 32 and the necessary relative positions of the two are restored.

As in the prior art, it is advantageous to slot the trip plate 30 where it fits around the stud 5. The oblong slot 36 is shown in FIG. 6. The slot 36 is operative when the trip plate ledge 32 does not properly restore in time and thus its side is engaged by the end of the pawl control element 7. The slot 36 allows the entire pawl assembly to slide to the hold position. While the parts are settling, the spring 34 will generally be successful in restoring the trip plate 30.

The second new structure shown in FIG. 6 is the holding flange 38. This is merely an element to hold the structure together. In the preferred embodiment it is a wide, thin flange integral with stud 5. Thus, the parts are pinned together by the holding flange 38 on one side and by the frame (not shown) on the other.

While the invention has been particularly shown and described with reference to a preferred embodiment thereof, it will be understood by those skilled in the art that the foregoing and other changes in form and details may be made therein without departing from the spirit and scope of the invention.

I claim:
1. An escapement pawl assembly for use with a structure having a plurality of pawl engaging projections comprising:
   a pawl adapted to engage said projections,
   means to brace said pawl against movement with said structure,
   means to remove said means to brace said pawl while leaving said pawl in engagement with a projection, and
   means independent of the engaged surface of an engaged projection to subsequently move said pawl from engagement with said projection.

2. An escapement pawl assembly for use with a biased, toothed rack comprising:
   a pawl adapted to engage one of said teeth as said teeth are presented to said pawl,
   means to brace said pawl against movement with said rack,
   means to remove said means to brace said pawl while leaving said pawl in engagement with a tooth, and
   means independent of the engaged surface of an engaged tooth to subsequently move said pawl from engagement with the tooth to which said pawl is engaged.

3. The combination of claim 2 wherein said rack is straight.

4. An escapement pawl assembly for use with a biased, toothed rack comprising:
   a pivoted pawl adapted to engage one of said teeth as said teeth are presented to said pawl,
   means to brace said pawl against movement with said rack,
   means to remove said means to brace said pawl while leaving said pawl in engagement with a tooth, and
   means independent of the engaged surface of an engaged tooth to subsequently pivot said pawl from engagement with the tooth to which said pawl is engaged.

5. The combination of claim 4 wherein said rack is straight.

6. An escapement pawl assembly for use with a biased, toothed rack comprising:
   a stationary stud,
   a pawl adapted to engage said rack and having an opening, said pawl being held by said stud through the opening of said pawl, a control element having an opening within which said stud can be situated at different points, said control element being held by said stud through the opening of said control element, a bracing abutment mounted on said control element to brace said pawl when said control element is in one position, means interconnecting said control element and said pawl to pivot together said control element and said pawl so that said bracing abutment will move from said pawl when said control element is moved from said one position and further pivoting will lift pawl from said rack, and means to move said pawl over at least one tooth of said rack when said pawl is freed from said rack.

7. An escapement pawl assembly for use with a biased, toothed rack comprising:

a stationary stud, a slotted pawl adapted to engage said rack, said pawl being held by said stud through the slot of said pawl, said pawl slot meshing with said stud in width and being longer than the width of said stud, a control element having an opening, said control element being held by said stud through the opening of said control element, said control element and said pawl being pivoted together by a pivoting projection caried by one of them and an oblong opening carried by the other, a bracing projection mounted on said control element to brace said pawl when said control element is in one position, said opening of said control element being extended to allow said bracing projection to move freely from said pawl when said control element is pivoted on said pivoting projection, said opening of said control element being terminated to cause further control element movement to pivot said pawl from said rack, and means biasing said control element to move said bracing projection into said pawl when said pawl is freed from said rack, said opening of said control element being extended to allow said bracing projection to so move into said pawl, said opening of said control element being terminated where said pawl has been moved over at least one tooth of said rack.

8. An escapement pawl assembly for use with a biased, toothed rack comprising:

a pivoted pawl having a first edge and a second edge and adapted to engage one of said teeth at said first edge as said teeth are presented to said pawl, said second edge being slanted with reference to the direction of bias of said rack, a brace positionable on said slanted edge to hold said pawl against movement with said rack when said pawl is engaged with said rack, means to move said brace away from said slanted edge while leaving said pawl in engagement with a tooth, and means independent of the engaged surface of an engaged tooth to subsequently pivot said pawl from engagement with the tooth to which said pawl is engaged.

9. The combination of claim 8 wherein said rack is straight.

10. An escapement pawl assembly for use with a biased, toothed rack comprising:

a stationary stud, a pawl adapted to engage said rack, said pawl having a first edge to engage a tooth of said rack, and a second edge slanted with reference to the direction of bias of said rack, and said pawl having an opening, said pawl being held by said stud through the opening of said pawl, a control element having an opening within which said stud can be situated at different points, said control element being held by said stud through the opening of said control element, a bracing abutment mounted on said control element and positionable on said slanted edge to brace said said pawl when said control element is in one position, means pivoting said control element to said pawl so that said bracing abutment will move away from said slanted edge when said control element is moved from said one position and further pivoting will lift said pawl from said rack, and means to move said pawl over at least one tooth of said rack when said pawl is freed from said rack.

11. An escapement pawl assembly for use with a biased, toothed rack comprising:

a stationary stud, a slotted pawl adapted to engage said rack, said pawl being held by said stud through the slot of said pawl, said pawl slot meshing with said stud in width and being longer than the width of said stud, said pawl having a first edge to engage a tooth of said rack and a second edge slanted with reference to the direction of bias of said rack, a control element having an opening, said control element being held by said stud through the opening of said control element, said control element and said pawl being pivoted together by a pivoting projection carried by one of them and an oblong opening carried by the other, a bracing projection mounted on said control element to brace said pawl at said slanted edge when said control element is in one position, said opening of said control element being extended to allow said bracing projection to move freely away from said pawl when said control element is pivoted on said pivoting projection, said opening of said control element being terminated to cause further control element movement to pivot said pawl from said rack, and means biasing said control element to move said bracing projection into said pawl when said pawl is freed from said rack, said opeining of said control element being extended to allow said bracing projection to so move into said pawl, said opening of said control element being terminated where said pawl has been moved over at least one tooth of said rack.

12. The combination as in claim 11 wherein said means biasing said control element is a spring mounted on said control element on the side of said stationary stud away from said rack whereby said spring will pivot said pawl into engagement with said rack when said control element opening is terminated after said pawl has been moved over said rack.

13. An escapement assembly comprising:

a spring biased, toothed rack, a stationary stud, a pawl having a first, front edge adapted to engage one of said teeth as said teeth are presented to said pawl and having a curved second, back edge, said pawl having a slot meshing with said stud in width, said slot extending beyond said stud in length in the direction from said second, back edge to said first, front edge, said pawl having a pivoting projection located between said pawl slot and said first, front edge, a control element having an oblong slot adapted to mesh with said pawl pivoting projection, said control element also having an opening receiving said stationary stud of dimensions to allow said control element to freely pivot on said pawl pivoting projection from a first position to a second position, said control element carrying a bracing projection which is positioned when said control element is in said first position near the furthest extending portion of said curved second, back edge of said pawl and which is moved away from said curved second, back edge of said pawl when said control element is pivoted on said pivoting projection, said control element oblong slot extending in the direction of said pawl slot when said control element is in said first position, means to pivot said control element in response to a force representative of a desired escapement, said control element having an extended portion on the side of said stationary stud away from said control element oblong slot to receive said means to pivot said control element, said means to pivot being adapted to bring said control element from said first position to said second position and then continually to a further position at which said pawl is lifted out of engagement with said rack, and a spring biasing said control element above said stud in a direction opposite to the bias direction of said rack, said control element opening being dimensioned to allow said bracing projection to move into contact with said pawl and to freely move said pawl over at least one tooth in said rack, said control element opeining being terminated where said pawl movement ends so that said spring will pivot said pawl into engagement position with said rack.

References Cited by the Examiner
UNITED STATES PATENTS

| | | | |
|---|---|---|---|
| 2,741,355 | 4/56 | Dodge | 197—86 |
| 2,892,289 | 6/59 | Ryan | 74—1.5 X |

ROBERT E. PULFREY, *Primary Examiner.*